US006678273B1

(12) United States Patent
Brown (10) Patent No.: US 6,678,273 B1
(45) Date of Patent: Jan. 13, 2004

(54) MANAGED PRIVATE NETWORK SYSTEM

(75) Inventor: Garth Brown, Seattle, WA (US)

(73) Assignee: Semaphore Corporation, Seattle, WA (US)

( * ) Notice: Subject to any disclaimer, the term of this patent is extended or adjusted under 35 U.S.C. 154(b) by 0 days.

(21) Appl. No.: 09/501,805

(22) Filed: Feb. 10, 2000

(51) Int. Cl.[7] .......................... H04L 12/28; H04L 12/56
(52) U.S. Cl. ................. 370/395.2; 370/395.3; 370/395.52
(58) Field of Search .................... 370/395.1, 395.2, 370/230, 395.3, 401, 410, 395.52

(56) References Cited

U.S. PATENT DOCUMENTS

| 5,889,470 | A | * | 3/1999 | Kaycee et al. ............... 370/465 |
| 6,085,238 | A | * | 7/2000 | Yuasa et al. .................. 709/223 |
| 6,097,719 | A | * | 8/2000 | Benash et al. ............... 370/352 |
| 6,272,109 | B1 | * | 8/2001 | Pei et al. ...................... 370/230 |
| 6,373,847 | B1 | * | 4/2002 | Scoggins et al. ............ 370/401 |
| 6,529,479 | B1 | * | 3/2003 | Suzuki ........................ 370/236.1 |
| 6,563,800 | B1 | * | 5/2003 | Salo et al. ................... 370/264 |
| 6,584,074 | B1 | * | 6/2003 | Vasamsetti et al. ......... 370/254 |
| 2001/0048686 | A1 | * | 12/2001 | Takeda et al. .............. 370/401 |
| 2002/0009093 | A1 | * | 1/2002 | Harris et al. ................ 370/410 |

* cited by examiner

*Primary Examiner*—Ajit Patel
*Assistant Examiner*—Chirag Shah
(74) *Attorney, Agent, or Firm*—Perkins Coie LLP (57) ABSTRACT

A managed private network ("MPN") system for interconnecting enterprise entities to subscriber entities. The MPN system uses the ATM protocol and segregates data for an enterprise on to virtual connections dedicated to the enterprise. Each enterprise may have a single connection to the MPN system. The MPN system may forward data to various service providers through which subscriber entities may be connected to the MPN system. Thus, the enterprise entities need not have a separate physical connection to each service provider. Also, the MPN system can offer services (e.g., archival storage) to the enterprise entities. The MPN system ensures that data for one enterprise will not be intermingled with the data of another enterprise.

11 Claims, 8 Drawing Sheets

MANAGED PRIVATE NETWORK SYSTEM

TECHNICAL FIELD

This disclosure relates generally to communications systems and in particular to managing connections between enterprises and subscribers.

BACKGROUND

Figure 1:
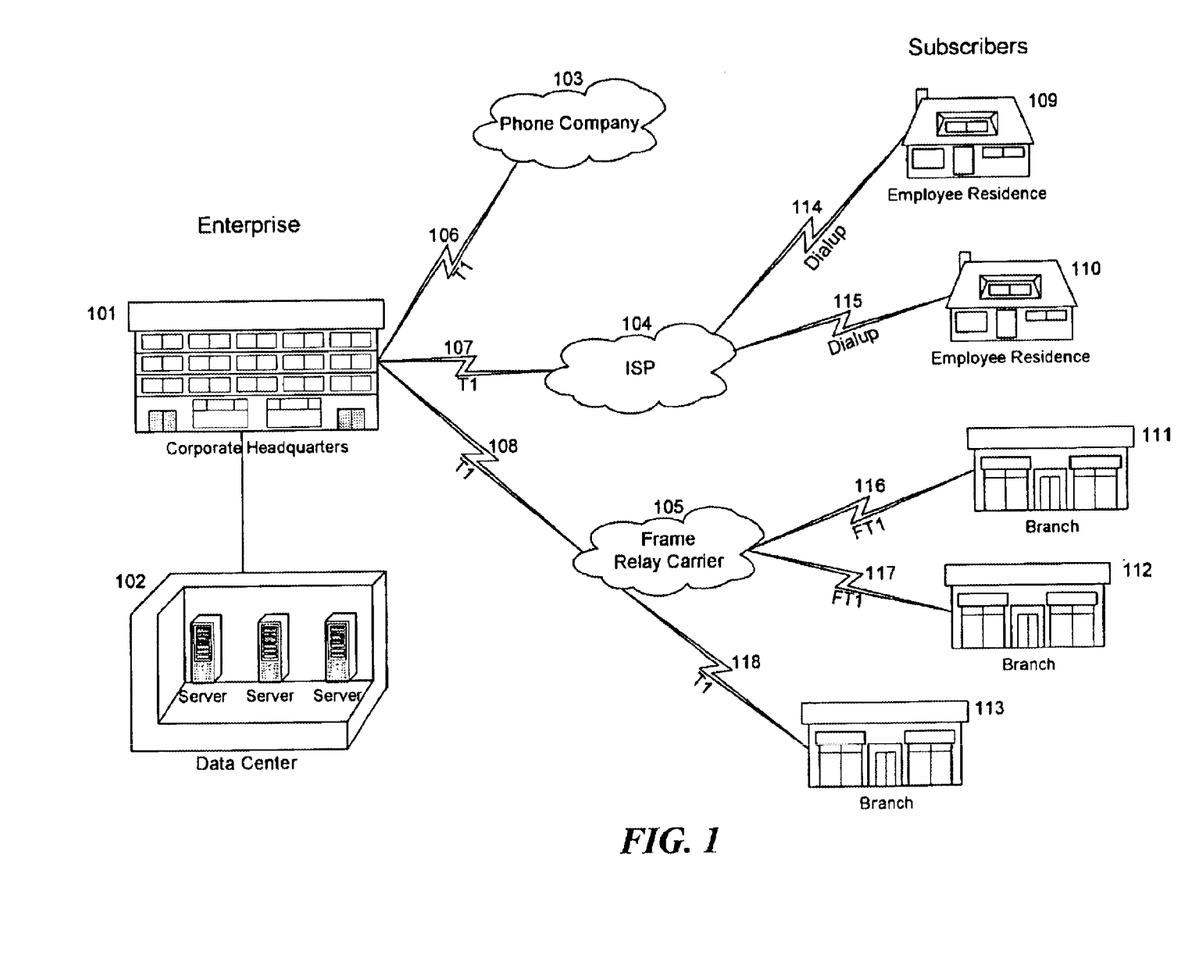
FIG. 1 is a block diagram illustrating a typical communications network to which an enterprise is connected.

Enterprises (e.g., corporations) need to establish communication channels to various subscribers (e.g., employees). These communication channels may be through various service providers, such as the public telephone switching network, Internet service providers ("ISP"), frame relay carriers, and digital subscriber line ("DSL") carriers. The cost of maintaining a communication channel to each service provider can be very expensive for an enterprise. FIG. 1 is a block diagram illustrating a typical communications network to which an enterprise is connected. The enterprise 101 may be connected to service providers such as the telephone company 103, ISP 104, and a frame relay carrier 105. A separate communications line 106–108, such as a T1 line, may be used to establish each connection. In addition, each subscriber 109–113 may need a separate line 114–118 to connect to the ISP or frame relay carrier. The enterprise needs to maintain termination equipment for each of the physical line 106–108 connected to a service provider. This termination equipment may include a router, a channel service unit/digital service unit ("CSU/DSU"), and so on. Whenever the enterprise needs to establish a connection to a new service provider, the enterprise needs to purchase a new line and associated termination equipment. Similarly, whenever a subscriber needs to connect to an enterprise, the subscriber needs termination equipment (e.g., a modem) and may need to also have a dedicated line (e.g., DSL) to the service provider.

The complexity and actual dollar cost of connecting to such service providers can be very high. More importantly, the time delay in establishing a connection to a service provider can be even more costly. Accordingly, it would be desirable to have a communications network that would help reduce the actual cost of the physical connections and in which connections to various service providers can be provided in a timely manner.

DETAILED DESCRIPTION

A managed private network system for allowing enterprises to connect to various subscribers through service providers without a need to establish a direct physical connection to each service provider is provided. The managed private network ("MPN") system allows an enterprise to connect to multiple service providers through a single physical connection terminating at the enterprise. This physical connection is between the enterprise and an MPN system. In one embodiment, the physical connection may be a high-speed line, such as a T3 line, and the communications between the enterprise and the MPN system is conducted using the asynchronous transfer mode ("ATM") protocol. (The ATM protocol is described in "Hands-On ATM" by McDysan and Spohn and published by McGraw-Hill in 1998, which is hereby incorporated by reference.) When the MPN system receives data via the physical connection from the enterprise, the MPN system causes the data to be routed to the appropriate service provider. The service provider then forwards that data to the intended subscriber. Similarly, when a subscriber sends data to a service provider, that service provider routes the data to the MPN system. The MPN system then forwards the data to the appropriate enterprise. Multiple enterprises may be connected to the MPN system. The data of each enterprise is kept separate and distinct from the data of other enterprise using, for example, a virtual connection for each enterprise. Each enterprise may have its own physical connection to the MPN system. Also, each subscriber would typically be assigned to a single enterprise.

The MPN system maintains various connections to service providers. When an enterprise wants to establish a connection to a service provider that is already connected to the MPN system, the MPN system can be reconfigured to route data received via the physical connection from the enterprise to that service provider. In this way, the enterprise can use the previously established physical connection with the MPN system to transmit data to a new service provider. In addition, the MPN system may provide additional services to the enterprise. For example, the MPN system may be coupled to an archival data storage system. The enterprise may back up its data onto the archival storage system. Also, an enterprise may use the MPN system to provide primary or backup access to the public telephone network.

In one embodiment, the MPN system comprises an aggregating ATM component, a switching ATM component, and an intermediary LAN component. Each enterprise is connected to the switching ATM via a high-speed physical communications line. Each service provider is connected to the aggregating ATM component via a physical communications line. The aggregating ATM component may receive data generated by subscribers and send data generated by the enterprise to the subscriber via a subscriber virtual connection dedicated to the subscriber by the aggregating ATM component. The aggregating ATM component maps each subscriber virtual connection to an enterprise/MPN virtual connection that is dedicated to the enterprise to which the subscriber is assigned. The enterprise/MPN virtual connection connects the aggregating ATM component to the switching ATM component. When the switching ATM component receives data from a subscriber via the enterprise/MPN virtual connection, the switching ATM component forwards the data to the intermediary LAN component. The intermediary LAN component decides how to process the data. For example, the intermediary LAN component may decide to send the data back to the switching ATM component so that it can be forwarded to the enterprise. When the switching ATM component receives data from an enterprise via an enterprise virtual connection dedicated to the enterprise, it forwards the data to the intermediary LAN component. Again, the intermediary LAN component decides how to process the data. The intermediary LAN component may decide to send the data to the switching ATM component so that it can be forwarded via the enterprise/MPN virtual connection to the aggregating ATM component. The aggregating ATM component can then forward the data to the intended subscriber via the subscriber virtual connection. The intermediary LAN component may process the data in ways other than forwarding the data. If the data is destined for a server which is connected to the intermediary LAN component via a LAN, such as an Ethernet VLAN, the intermediary LAN component may forward the data to a LAN or virtual LAN dedicated to the enterprise. The switching ATM component may forward data to and receive data from the intermediary LAN component via virtual connections dedicated to each enterprise. Thus, the MPN system uses a series of virtual connections (each virtual connection in the series dedicated to a single enterprise) to send data between that enterprise and the aggregating ATM. In this way, the data of an enterprise can be kept separate and distinct from that data of other enterprises.

Figure 2:
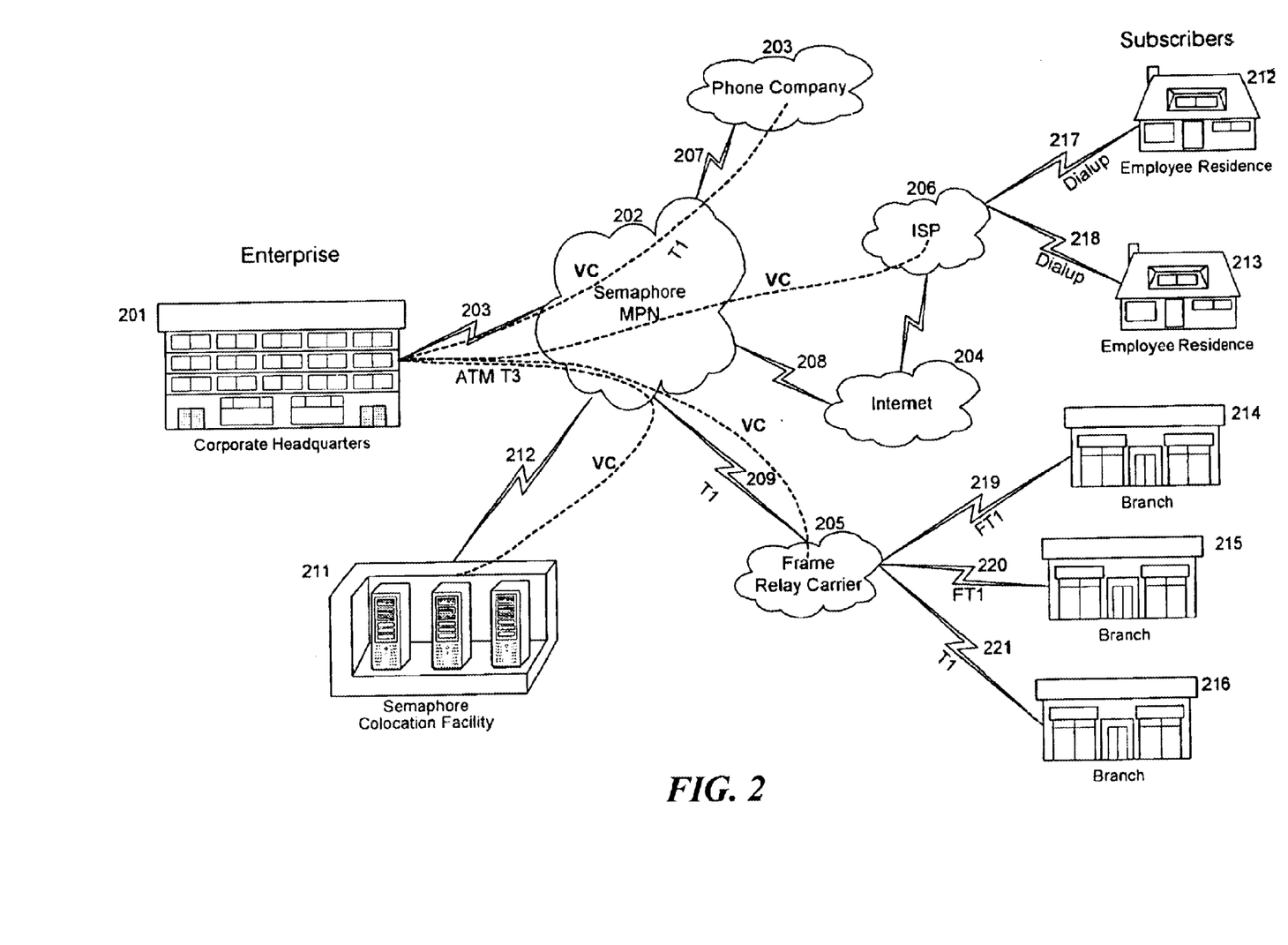
FIG. 2 is a block diagram illustrating the interconnections between the managed private network ("MPN") system and the enterprises, subscribers, and service providers.

FIG. 2 is a block diagram illustrating the interconnections between the MPN system and the enterprises, subscribers, and service providers. The enterprise 201 is a connected to the MPN system 202 via a single physical layer connection 203, such as a T3 line. The MPN system is connected to each service provider 203–205 via a single physical layer connection 207–209, such as a T1 line. The MPN system may be connected to a service provider, such as an ISP 206, indirectly through another service provider such as to the Internet 204. The MPN system establishes a series of virtual connections (VC) for each enterprise. This series of virtual connections may optionally extend to each service provider as shown in FIG. 2. The MPN system may provide a connection to a computer system colocated with the MPN system for use by the enterprises. Each of the subscribers 212–216 are connected to a service provider via a single physical layer connection 217–221, such as a dial up or a T1 line. The various virtual connections can be established to have different quality of service requirements that are implemented via the ATM components. For example, the virtual connection to a telephone company service provider may need a real-time quality of service, whereas a virtual connection used for email may only need a non-real-time quality of service.

Figure 3A:
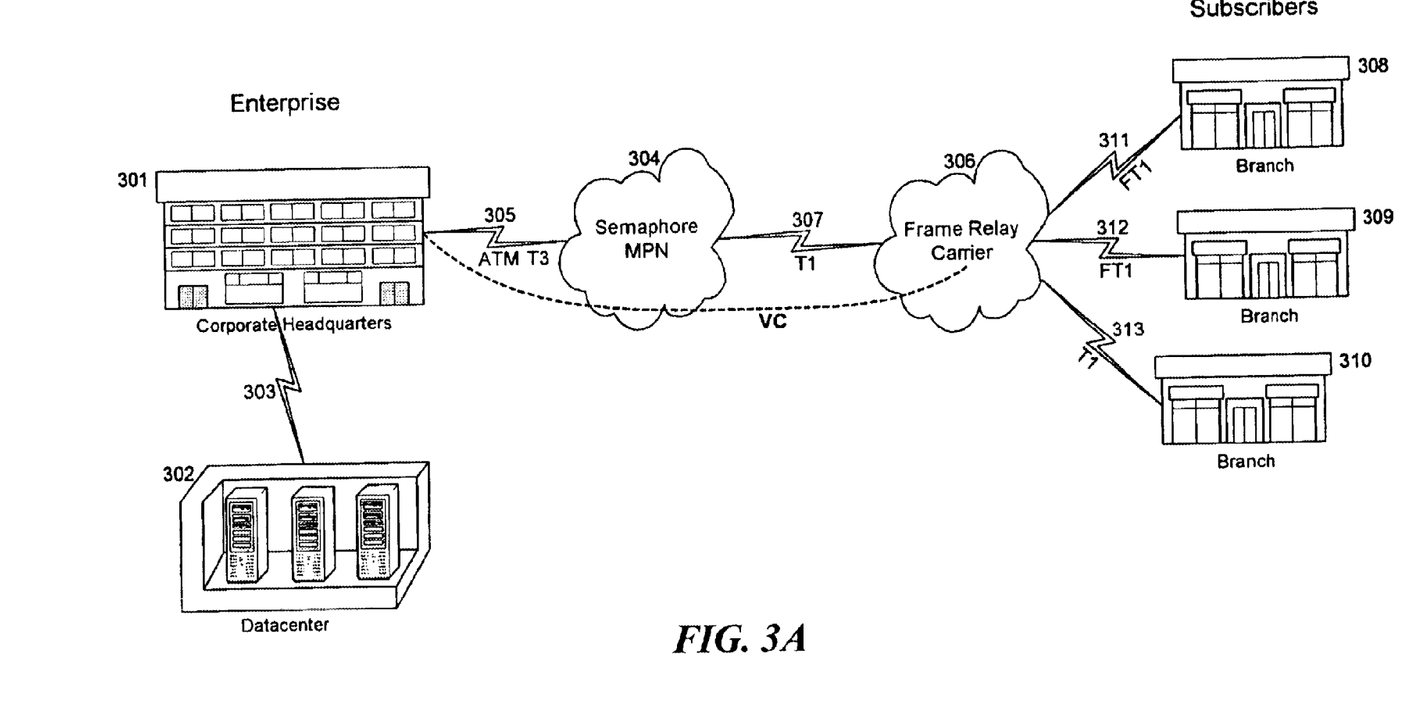
FIG. 3A is a block diagram illustrating a typical initial configuration for connecting an enterprise to its subscribers through an MPN system.

FIG. 3A is a block diagram illustrating a typical initial configuration for connecting an enterprise to its subscribers through an MPN system. The enterprise 301 may be connected to the MPN system 304 via a single physical layer connection 305, and the MPN system may be connected to only one service provider, such as a frame relay carrier 306, via a single physical layer connection, such as a T1 line 307. The service provider may be connected to each subscriber 308–310, such as a branch office of the enterprise, via a physical layer connection 311–313. In this configuration, the MPN system establishes a series of virtual connections between each enterprise and the service provider. The virtual connections may be established from an enterprise to a service provider if, for example, the aggregating ATM component is located at or is under the control of the service provider. The enterprise in this configuration may have a physical layer connection 303 directly to its data center 302.

Figure 3B:
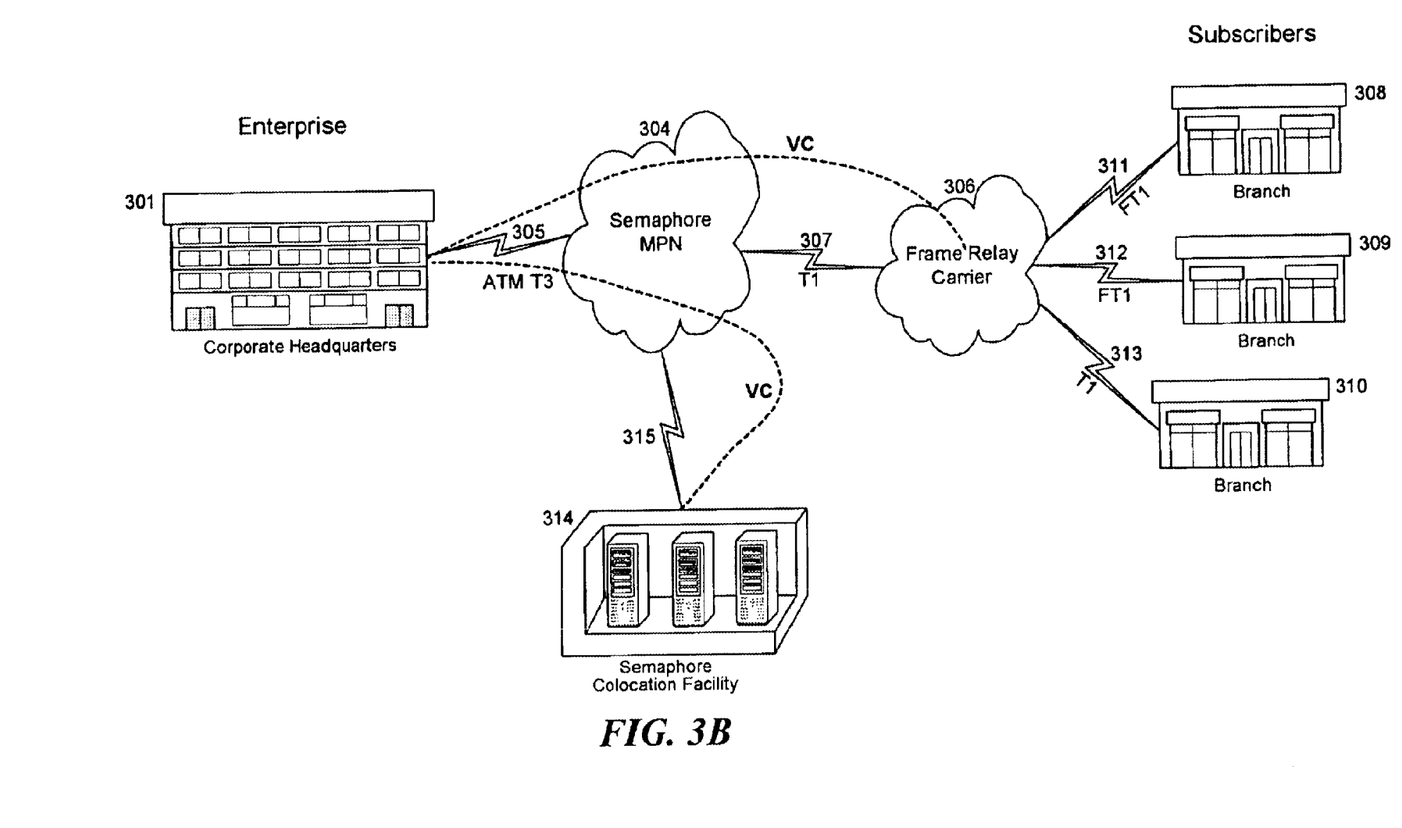
FIG. 3B is a block diagram illustrating a configuration when the enterprise's data center is directly connected to the MPN system.

FIG. 3B is a block diagram illustrating a configuration when the enterprise's data center is directly connected to the MPN system. In this example, the data center as shown in FIG. 3A is now shown as connected to the MPN system via physical layer connection 315. The MPN system establishes a series of virtual connections dedicated to the enterprise from the enterprise to the data center 314. The data center may replace the data center of the enterprise or may serve to augment that data center. For example, data center 314 may serve as a backup to data center 302 in the event of a failure that prevents the enterprise from accessing data center 302.

Figure 4A:
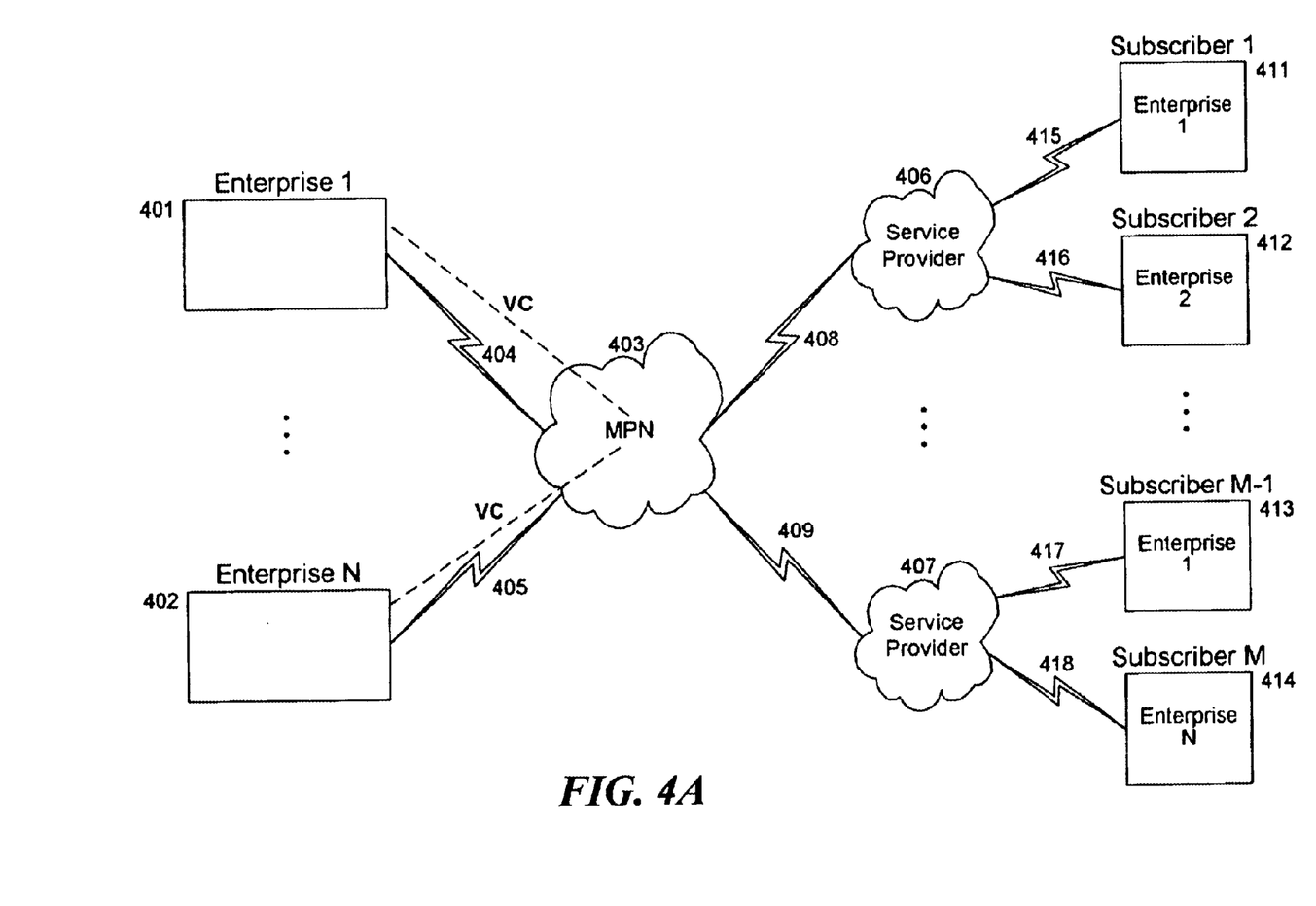
FIG. 4A is a block diagram illustrating the connection of multiple enterprises and multiple subscribers through the MPN system.

FIG. 4A is a block diagram illustrating the connection of multiple enterprises and multiple subscribers through the MPN system. Each enterprise 401–402 is connected to the MPN system 403 via a physical layer connection 404–405. Each service provider 406–407 is connected to the MPN via a physical layer connection 408–409. Each subscriber 411–414 is assigned to an enterprise. For example, subscriber 411 may be an employee of enterprise 401, and subscriber 414 may be a branch office of enterprise 402. In one embodiment, a series of virtual connections is established for each enterprise that extends from the enterprise to the aggregating ATM component.

Figure 4B:
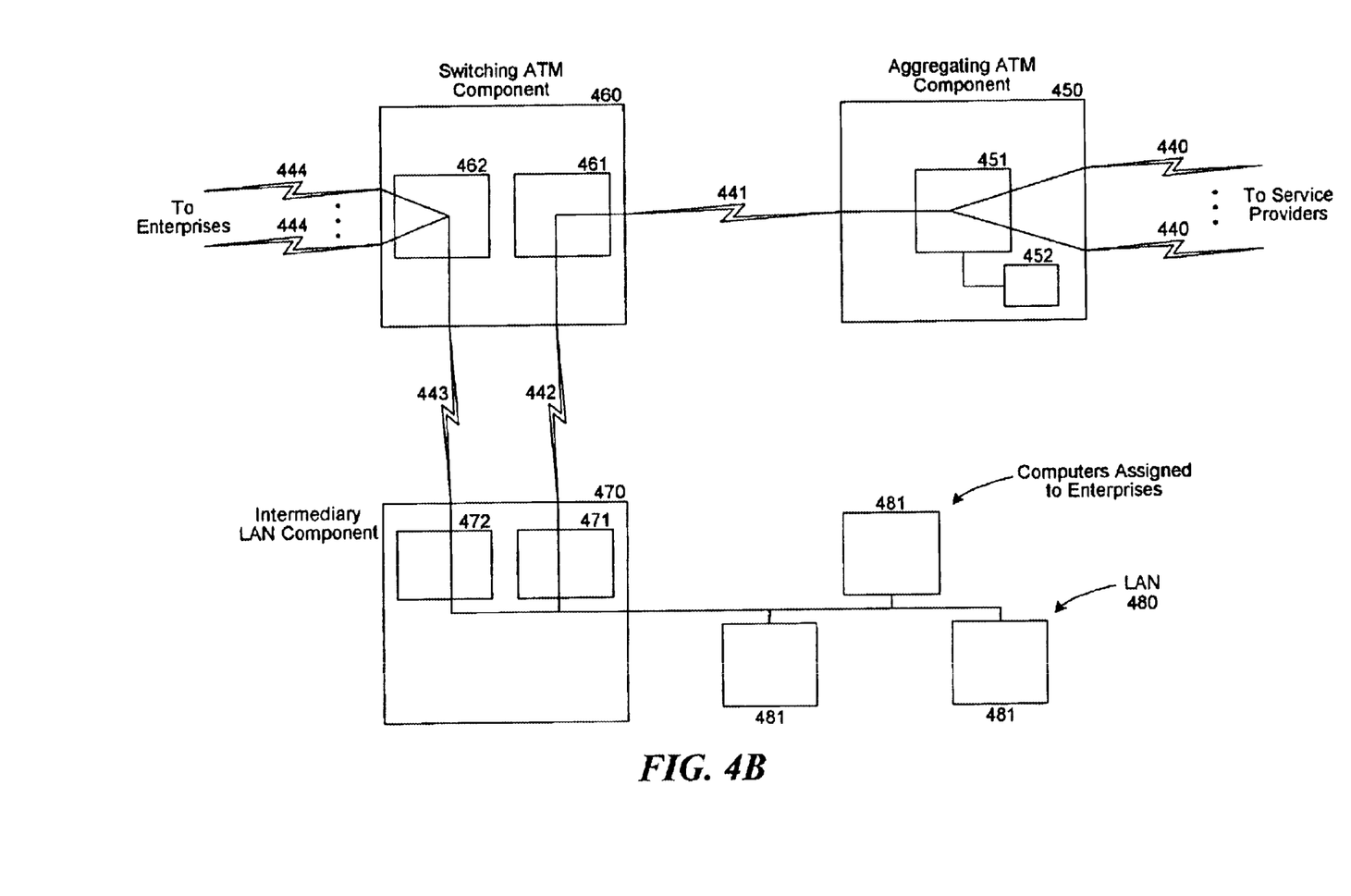
FIG. 4B is a block diagram illustrating the architecture of the MPN system in one embodiment.

FIG. 4B is a block diagram illustrating the architecture of the MPN system in one embodiment. The MPN system includes the aggregating ATM component 450, a switching ATM component 460, and an intermediary LAN component 470. The aggregating ATM component is connected to various service providers via connections 440 and is connected to the switching ATM component via connection 441. The switching ATM component is connected to the intermediary LAN component via connections 442 and 443 and is connected to the enterprises via connections 444. The intermediary LAN component is connected to a LAN 480 that includes various computers 481 that are assigned to enterprises. The aggregating ATM component includes aggregation module 451 and a subscriber/enterprise map 452. The aggregation module receives ATM data generated by subscribers from the service providers via subscriber virtual connections. The aggregation module uses the subscriber/enterprise map to identify to which enterprise a subscriber is assigned. The aggregation module forwards the ATM data for a subscriber through an enterprise/MPN virtual connection for the enterprise on physical connection 441. The aggregation module also routes ATM data received via connection 441 to the corresponding subscriber virtual connection of the subscriber on physical connections 440. The switching ATM component includes a subscriber interface module 461 and an enterprise interface module 462. The subscriber interface module transmits ATM data between the aggregating ATM component and the intermediary LAN component. The enterprise interface module routes the ATM data between the intermediary LAN component and the enterprises. The intermediary LAN component includes a subscriber ATM/LAN module 471 and an enterprise ATM/LAN module 472. The subscriber ATM/LAN module transmits ATM data between the subscriber side of the switching ATM component and the LAN. The subscriber ATM/LAN module converts ATM data to LAN formatted data, and vice versa. Data is transmitted between the subscriber ATM/LAN module and the subscriber interface module via a virtual connection dedicated to an enterprise through physical connection 442. The enterprise ATM/LAN module routes ATM data between the LAN and the enterprise side of the switching ATM component. The enterprise ATM/LAN module converts ATM data to LAN formatted data, and vice versa. Data is transmitted between the enterprise/ATM module and the enterprise interface module via a virtual connection dedicated to an enterprise through physical connection 443. The subscriber and enterprise ATM/LAN modules may alternately transmit ATM data directly to each other bypassing the LAN (i.e., "bypass mode"). The LAN may have a VLAN for each enterprise. When an ATM/LAN module transmits data onto the LAN it directs it to the appropriate VLAN for the enterprise. The computers connected to the LAN can then process the data as appropriate. For example, a computer on the VLAN may provide archival storage capabilities for an enterprise. In one embodiment, the intermediary LAN component may be directly connected to a service provider such as the public telephone network system. In this way, the intermediary LAN component could direct voice over IP data to the public telephone network system. One skilled in the art would appreciate that the MPN system may be implemented with many different architectures. Generally, the MPN system provides a single physical connection to each enterprise through which the enterprise can communicate with its subscribers. The MPN system can be augmented to provide additional services (e.g., archival storage) to the enterprises. Since connections to the enterprises are already established, the incremental cost of providing the additional services may be small. An enterprise may be alternatively connected directly to a LAN of the intermediary LAN component. In this case, the data of the enterprise would flow through the LAN to the intermediary LAN component to the switching ATM component, and on to the aggregating ATM component. An enterprise may connect directly to the intermediary LAN component if, for example, the computer system of the enterprise is collocated with the intermediary LAN component or the enterprise has a high-speed (e.g., optical fiber) LAN connection to the MPN system.

The virtual connections dedicated to an enterprise may correspond to a common network layer dedicated to the enterprise. The network layer may comply with layer 3 of the International Standards Organization ("ISO") Open Systems Interconnection ("OSI") protocol reference model. The various service providers may use different implementations of the sub-network layer. That is, the service providers may use different physical and data link layer implementations of the OSI model. The MPN system can aggregate data from multiple service providers regardless of their sub-network layer implementations.

In one embodiment, in the MPN system is implemented using the following components.

| Functional Component | Implementing Component |
|---|---|
| Aggregating component | Redback Networks SMS-1000 |
| Intermediary LAN component | Cisco Systems Catalyst 5513 |
| Switching component | Cisco Systems LightStream 1010 |

Tables 1–3 illustrate the configuration of the implementing components in one embodiment.

TABLE 1

Redback Networks SMS-1000

| RB-CHAC-IS-1K | Redback 1000 Chassis with AC input |
|---|---|
| RB-PS-1K-AC | AC power supply |

TABLE 1-continued

Redback Networks SMS-1000

| RB-PS-1K-AC | AC power supply |
|---|---|
| RB-CE1-1K-32MB | Control Engine with 32MB RAM |
| RB-FE-1K-8MB | Forwarding Engine with 8MB RAM |
| RB-EIM-1K-2TX | 2x10/100 BaseT Ethernet I/O Module |
| RB-AIM-1K-2DS3 | 2xATM DS-3 I/O Module |
| RB-AIM-1K-20C3MM | 2xATM OC-3 I/O Module |
| RB-SW4000-1K-1.0 | 4000 subscriber AOS (access Operating System) Software License |

TABLE 2

Cisco Systems Catalyst 5513

| WS-C5500 | Catalyst 5513 Chassis |
|---|---|
| WS-C5508 | Catalyst 5500 AC Power Supply |
| WS-5508/2 | Redundant Catalyst 5500 AC Power Supply |
| WS-X5530-E3 | Catalyst 5500/5000 Supervisor Engine Module w/NFFC II |
| WS-U5533-FEFX-MMF | Dual Port 100BaseFX MMF Uplink Module for Supervisor |
| WS-X5225R | 24 Port 10/100TX Backbone Switching (FEC, 802.1Q/ISL, RJ-45) |

TABLE 3

Cisco Systems LightStream 1010

| L1010-ASP-C-FC1 | ATM Switch Processor with FC-Per-Class Queuing |
|---|---|
| SF-WAS5-5 | LS1010 IISP and PNNI Feature Set |
| MEM-ASP-64M | LightStream 1010 64 MB DRAM |
| WATM-CAM-2P | Lightstream1-1-/C5500 Carrier Module |
| WATM-CAM-2P | Lightstream1-1-/C5500 Carrier Module |
| WAI-OC3-4MM | 4 Port STS-3c/STM-1 Multimode Fiber PAM |
| MAI-T3-4BNC | 4 Port DS-3 Port Adaptor Modules |
| WAI-T1-4RJ48 | 4 Port T1 (ATM) with RJ-48 Interface PAM |
| WAI-OC3-4SS | 4 Port STS-3c/STM-1 Single-Mode Fiber PAM |

Figure 5:
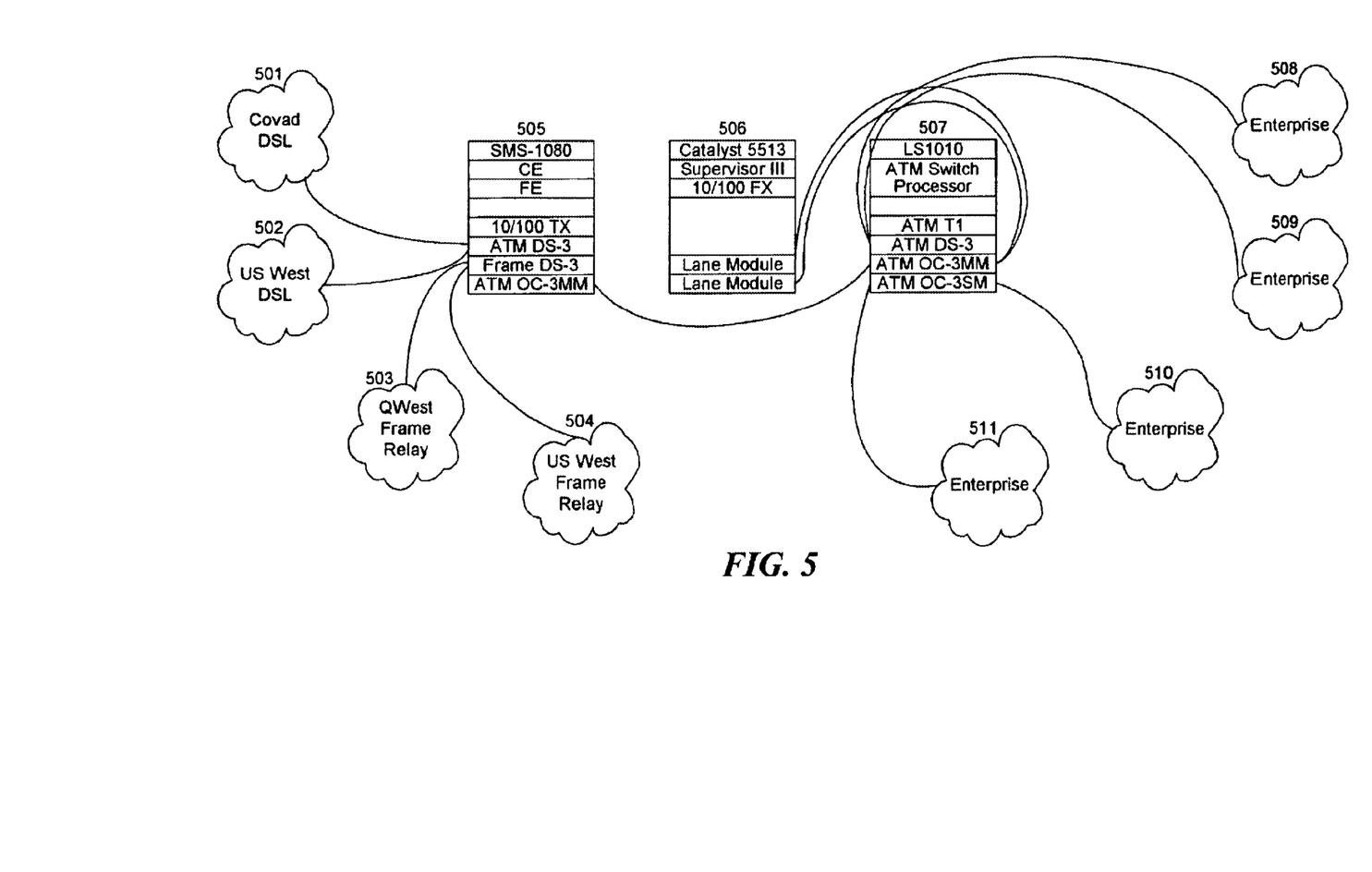
FIG. 5 is a block diagram illustrating the interconnections of the implementing components of the MPN system in one embodiment.

FIG. 5 illustrates the interconnections of the implementing components of the MPN system in one embodiment. Each service provider 501–504 is connected to an I/O module of the subscriber management system ("SMS") component 505 (e.g., the Redback Networks SMS-1000). For example, an ATM component of a digital subscriber line ("DSL") service provider may be connected to an ATM DS-3 I/O module of the SMS component. An ATM OC-3 I/O module of the SMS component is connected to an ATM I/O module of the LightStream component 507 (e.g., the Cisco Systems LightStream 1010). An ATM OC-3 I/O module of the LightStream component is connected via two connections to the Catalyst component 506 (e.g., the Cisco Systems Catalyst 5513). In this embodiment, two separate physical connections to the Catalyst component are needed because the Catalyst component is designed to not send a packet back out on the same connection on which it was received. Therefore, to send a packet back to the LightStream component a second connection is needed. This is referred to as a "split horizon" problem. Each connection between the LightStream component and the Catalyst component is connected to a separate LAN emulation ("LANE") module of the Catalyst component. Each enterprise 508–511 is connected to an I/O module (e.g., an ATM OC-3 I/O module) of the LightStream component. The operation of each implementing component is described in the following.

The SMS component serves as a connection aggregation point that allows a large number of incoming physical and virtual connections from a variety of service providers to be terminated and segregated according to defined policies. For example, a single enterprise may have several hundred subscribers using DSLs through two different service providers and may have 50 locations using frame relay T1 lines through one service provider and 10 locations using point-to-point T1 lines through another service provider. These connections are directly attached to be SMS component. The SMS component binds (i.e., logically associates on an exclusive basis) each subscriber virtual connection to a SMS context (i.e., a logical secure partition within the SMS component). A current implementation of the SMS component may support 8000 incoming connections bound to as many as 40 different contexts. Future upgrades of the SMS component may provide for more connections and contexts.

The SMS component is connected to the LightStream component over one or more physical ATM connections. (e.g., a multimode OC-3 connection). Each context of the SMS component forwards its data via a single enterprise/MPN virtual connection to the LightStream component. Thus, the segregation of enterprise data performed by the SMS component is extended to include the connection to the LightStream component and the remainder of the MPN system. This segregation provides a high level of security for an enterprise in that data packets for an enterprise are not intermingled with data packets of other enterprises on a single virtual connection.

The LightStream component receives data for each enterprise on a separate virtual connection from the SMS component. The LightStream component performs the following major functions:

1. The LightStream component builds and binds each incoming enterprise virtual connection to another virtual connection on one LANE module within the Catalyst component. The connection from the LightStream component to the Catalyst component is over physical OC-3 multimode connection.
2. The LightStream component builds and binds a virtual connection to another LANE module within the Catalyst component over another physical OC-3 multimode connection. The Catalyst component binds each virtual connection of the one LANE module to a virtual connection on the other LANE module.
3. The LightStream component binds each virtual connection from the other LANE module to a virtual connection on a port interface card in the LightStream component to which an enterprise may connecta circuit that extends back to the enterprise's primary data center or corporate network. The enterprise's physical connection to the media or wire carrying the data may be via a router located at the enterprise.

The Catalyst component is an Ethernet switch with an ATM interface included in an ATM LANE module. Each LANE module provides an interconnection between an ATM virtual connection and an Ethernet virtual local area network ("VLAN"). A VLAN is logical partition of an Ethernet network. The connection from the SMS component via the LightStream component into the one LANE module is switched to either to a local Ethernet LAN or back onto the other LANE module bound to the enterprise.

Figure 6:
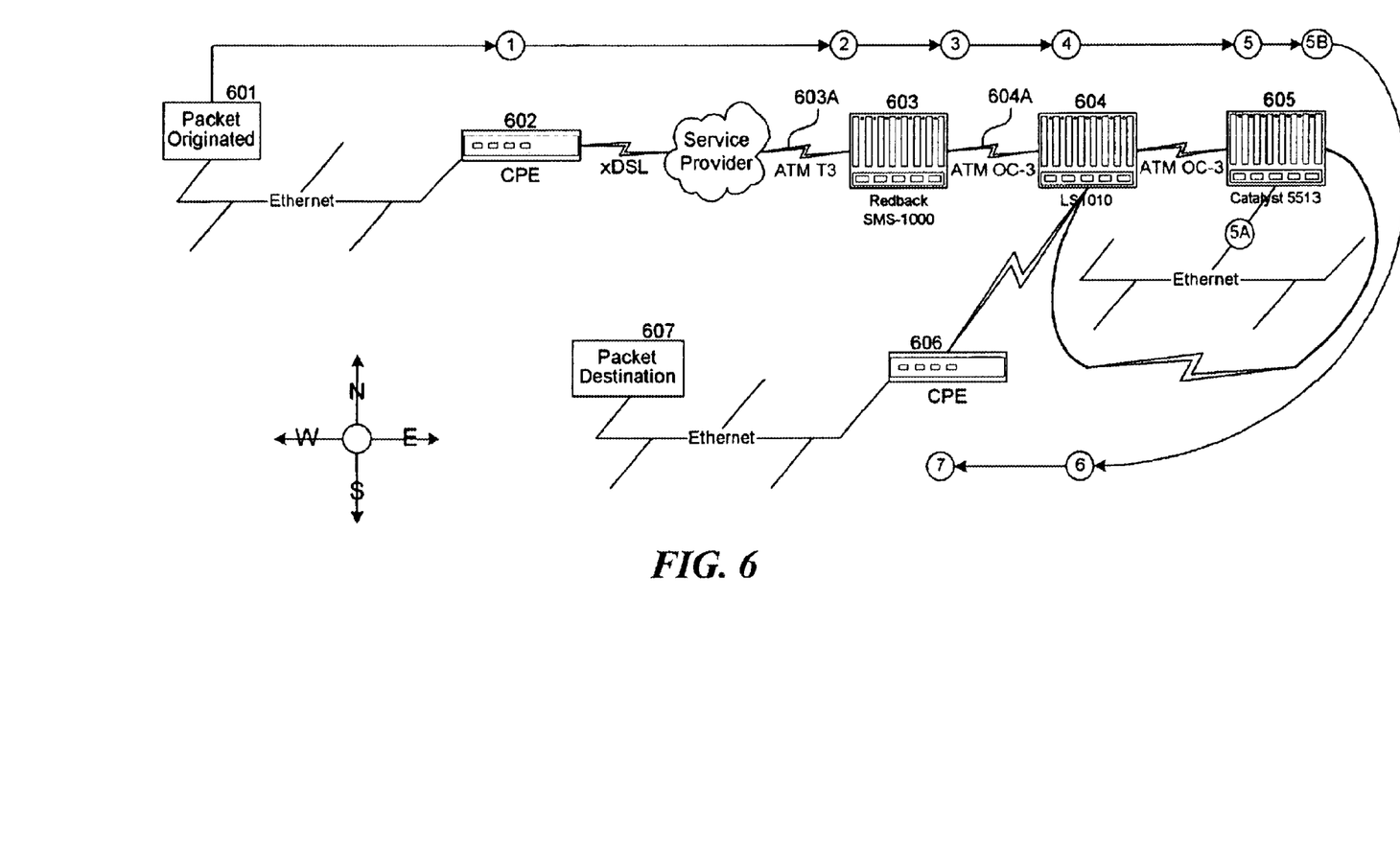
FIG. 6 is a block diagram illustrating the data flow of a packet from a subscriber to an enterprise.

FIG. 6 is a block diagram illustrating the data flow of a packet from a subscriber using DSL to an enterprise. A packet may originate at a personal computer 601 of a subscriber and be transmitted via an Ethernet network to a customer's customer premise equipment 602 ("CPE"). The packet may be formatted as an Ethernet frame in the IEEE 802.2 media access layer and 802.3 topology protocols. When the CPE receives the frame, it uses its media access control ("MAC") address resolution table ("ARP") to determine if the requested destination is on a locally connected network or other remote network. If the destination is on the locally connected network, then the CPE delivers the frame as specified by the IEEE 802 protocol. If the destination is remote, then the CPE segments and reassembles ("SARs") the MAC frame in the ATM cell and tags it as a bridge or routed packet data unit ("PDU") in accordance with the RFC 1483 specification within the payload field of the common part convergence sublayer ("CPCS") PDU of the ATM adaptation layer, type 5 SNAP ("AAL5 SNAP"). The CPE then injects the cell into a virtual connection of the attached wide area network circuit.

The CPE generated cell then arrives at the SMS component 603 of a specific ATM virtual connection, which may be one of many virtual connections carried on a single physical layer ATM line and where each virtual connection is established for each. CPE. The SMS component associates the PDU with a bridging group associated with the enterprise to which the subscriber is assigned. The PDU is then the segmented and reassembled to strip away the AAL5 SNAP header information so that the type of payload (e.g., bridge to ethernet packet) contained with in the cell can be determined. The SMS component then forwards the Ethernet frames to the virtual connection to the destination MAC address specified in the Ethernet frame header, which could be other customer premise equipment or the LightStream component.

A bridging group is a transparent bridge using IEEE 802 protocol family encapsulation for Ethernet frames. Each bridging group holds a bridging table of known MAC addresses (acquired locally or using a spanning tree protocol from adjacent devices) and switches traffic outbound across the virtual connection closest to the destination MAC address if the MAC address is contained in the bridging table. Any traffic destination for an unknown MAC address is flooded outbound on all virtual connections within the bridging group.

The SMS component then the segments and reassembles the Ethernet frame into ATM cell that is tagged as a 1483 PDU in the payload field of the CPCS PDU of the AAL5 and that is then injected into the enterprise/MPN virtual connection over physical connection 603A. The cell is forwarded over the enterprise/MPN virtual connection dedicated to the enterprise's traffic to the LightStream component 604.

When the LightStream component receives the cell on the enterprise/MPN virtual connection, it switches the cell onto a virtual connection dedicated to the enterprise that is statically mapped to a virtual connection over physical connection 604A bound to a LANE module of the Catalyst component 605. There is a one-to-one relationship between the enterprise/MPN virtual connection for an enterprise and the virtual connection for enterprise on the LANE module. When the cell is received at the LANE module, the module segments and reassembles it back into an Ethernet frame with an associated destination MAC address. The LANE module then decides whether to forward to the cell to a VLAN or to the enterprise. If the cell is to be routed onto a VLAN, it is directed to a RFC 802.1q or Cisco ISL VLAN which is directly associated with the incoming virtual connection on a one-to-one basis. This VLAN is terminated directly on an 802.3 Ethernet port on the Catalyst component. If the cell is destined to the enterprise, then the Catalyst component forwards the cell to the other LANE module on a virtual connection dedicated to the enterprise that is statically mapped to the virtual connection for the enterprise. The Catalyst component segments and reassembles the frame and tags it as a 1483 PDU in the payload field of the CPCS PDU of the AAL5 SNAP header and then injects it into the virtual connection dedicated to the enterprise.

The LightStream component receives the cell and switches it to a single enterprise virtual connection that is mapped on a one-to-one basis to a physical ATM connection connected to an enterprise. This enterprise virtual connection is terminated at a CPE device located at the enterprise's main data center or the enterprise's LAN location. The CPE device receives the cell and segments and reassembles it back an Ethernet frame. The CPE device then injects the frame according to the IEEE 802 protocol standards onto the local area network at the enterprise.

From the foregoing, it will be appreciated that although specific embodiments of the MPN system have been described for purposes of illustration, various modifications may be made without deviating from the spirit and the scope of the invention. For example, a virtual connection can be extended from an enterprise to a service provider by either providing a physical ATM connection from the service provider to the LightStream component or providing a physical Ethernet connection from a service provider to the Catalyst component. That is, the functions of the various components can be located at or controlled by different entities (e.g., service providers). Also, the functions provided by the various components can be even further divided among more components or consolidated into fewer components. For example, the function associated with the connection to each LANE module of the Catalyst component could be performed by different LightStream components. Also, each component may be replaced by multiple components (arranged as a network or hierarchy) to facilitate scalability of the MPN system. For example, the SMS component can be replaced by multiple SMS components in a hierarchical or non-hierarchical arrangement. Also, the enterprises and subscribers may be any entity including a corporation, division, branch, employee and so on. Accordingly, the invention is not limited except by the following claims.

What is claimed is:

1. A communications system for providing communications between enterprises and subscribers, each subscriber being assigned to an enterprise, comprising:

an aggregation component connected to a subscriber virtual connection for each subscriber and connected to an enterprise/system virtual connection for each enterprise, the aggregation component for mapping the subscriber virtual connection of each subscriber to an enterprise/system virtual connection of the enterprise to which the subscriber is assigned;

a switching component connected to the enterprise/system virtual connection of each enterprise, connected to a first and a second LAN virtual connection of each enterprise, and connected to an enterprise connection for each enterprise, the switching component for binding the enterprise/system virtual connection of each enterprise to the first LAN virtual connection of the enterprise and for binding the enterprise connection for each enterprise to the second LAN virtual connection of the enterprise; and an intermediary component connected to each first and the second LAN virtual connections of each enterprise, the intermediary component for receiving data from the first and second LAN virtual connections of each enterprise and processing the received data.

2. The communications system of claim 1 wherein the intermediary component processes data received via the first LAN virtual connection of an enterprise by transmitting the received data on the second LAN virtual connection of the enterprise and processes data received via the second LAN virtual connection of the enterprise by transmitting the received data via the first LAN virtual connection of the enterprise.

3. The communications system of claim 1 wherein the intermediary component receives voice data via the second LAN virtual connection of an enterprise and processes the received voice data by transmitting the data onto a public telephone network.

4. The communications system of claim 1 wherein the intermediary component processes the data received via the second LAN virtual connection for an enterprise by storing the received data in a storage area assigned to that enterprise.

5. The communications system of claim 1 wherein the aggregation component Is an ATM switching system.

6. The communications system of claim 1 wherein the switching component is an ATM switching system.

7. The communications system of claim 1 wherein the intermediary component includes interconnections between an ATM virtual circuit and a virtual local area network.

8. A method for providing communications services between entities, the method comprising:

establishing a physical connection with an enterprise entity and a connection with plurality of subscriber entities;

receiving data from the enterprise entity and forwarding the received data to an intermediary component via an internal virtual connection dedicated to the enterprise entity;

receiving data from the subscriber entities and forwarding the received data to the intermediary component via the internal virtual connection dedicated to the enterprise entity;

under control of the intermediary component,
when in a pass through mode,
forwarding data received from the enterprise entity to an intended subscriber via an internal virtual connection dedicated to the enterprise entity; and
forwarding data received from a subscriber entity to the enterprise entity via an internal virtual connection dedicated to the enterprise entity; and when not in pass through mode, forwarding data received from the enterprise entity to a virtual LAN dedicated to the enterprise entity.

9. The method of claim 8 wherein the mode of the intermediary component is based on the content of the received data.

10. The method of claim 8 wherein data is ATM data.

11. The method of claim 10 wherein the forwarding to a virtual LAN includes converting ATM data to LAN data.

* * * * *

UNITED STATES PATENT AND TRADEMARK OFFICE
CERTIFICATE OF CORRECTION

PATENT NO. : 6,678,273 B1
DATED : January 13, 2004
INVENTOR(S) : Garth Brown

It is certified that error appears in the above-identified patent and that said Letters Patent is hereby corrected as shown below:

Column 7,
Line 22, delete period between "connections" and "(e.g., multimode OC-3 connection)";

Column 8,
Line 24, delete period between "each" and "CPE";

Signed and Sealed this

Twenty-second Day of June, 2004

JON W. DUDAS
*Acting Director of the United States Patent and Trademark Office*